(12) United States Patent
Tamizkar (10) Patent No.: US 10,887,227 B2
(45) Date of Patent: Jan. 5, 2021

(54) METHODS AND APPARATUSES FOR ROUTING DATA PACKETS IN A NETWORK TOPOLOGY

(71) Applicant: Telia Company AB, Solna (SE)

(72) Inventor: Babak Tamizkar, Stockholm (SE)

(73) Assignee: Telia Company AB, Solna (SE)

( * ) Notice: Subject to any disclaimer, the term of this patent is extended or adjusted under 35 U.S.C. 154(b) by 176 days.

(21) Appl. No.: 16/054,356

(22) Filed: Aug. 3, 2018

(65) Prior Publication Data
US 2019/0068494 A1    Feb. 28, 2019

(30) Foreign Application Priority Data
Aug. 25, 2017 (SE) ...................................... 1751021

(51) Int. Cl.
*H04L 12/721* (2013.01)
*H04L 12/751* (2013.01)
(Continued)

(52) U.S. Cl.
CPC .............. *H04L 45/72* (2013.01); *H04L 45/02* (2013.01); *H04L 45/74* (2013.01);
(Continued)

(58) Field of Classification Search
CPC ......... H04L 45/72; H04L 45/02; H04L 45/74; H04L 61/1511; H04L 65/102;
(Continued)

(56) References Cited

U.S. PATENT DOCUMENTS 6,980,524 B1 * 12/2005 Lu ........................... H04L 45/04
370/254
7,076,559 B1 * 7/2006 Ghanwani ............... H04L 45/04
370/352
(Continued)

FOREIGN PATENT DOCUMENTS

EP    2793437 A1    10/2014
EP    2863614 A1    4/2015
(Continued)

OTHER PUBLICATIONS

European Search Report, App. No. 18185541.12, Jan. 17, 2019, pp. 1-6, European Patent Office, Munich, Germany, Laurent Lefebvre.
(Continued)

*Primary Examiner* — Brian J. Gillis
*Assistant Examiner* — Javier O Guzman
(74) *Attorney, Agent, or Firm* — Burr & Forman LLP; Jeffrey H. Kamenetsky (57) ABSTRACT

The embodiments herein relate to methods, a source host device, an edge router device and a hop router device for routing data packets in a network topology. A method includes sending a request to a server for requesting an autonomous system number of an autonomous system to which a destination host belongs; receiving a response including the autonomous system number; inserting the received number between layer 2 and layer 3 of the data packet and sending the data packet towards the autonomous system hosting the IP address of the destination host. When a router belonging to the autonomous system receives the packet, the number is removed and forwarded to the destination host.

5 Claims, 8 Drawing Sheets

(51) Int. Cl.
*H04L 12/741* (2013.01)
*H01L 29/12* (2006.01)
*H04L 29/06* (2006.01)
*H04L 29/08* (2006.01)
*H04L 29/12* (2006.01)

(52) U.S. Cl.
CPC ........ *H04L 61/1511* (2013.01); *H04L 65/102* (2013.01); *H04L 67/2842* (2013.01)

(58) Field of Classification Search
CPC ..... H04L 67/2842; H04L 45/04; H04L 45/54; H04L 45/64
See application file for complete search history.

(56) References Cited

U.S. PATENT DOCUMENTS

| | | | | |
|---|---|---|---|---|
| 7,852,772 | B2* | 12/2010 | Filsfils | H04L 45/00 370/238 |
| 10,044,729 | B1* | 8/2018 | Astakhova | H04L 63/105 |
| 10,171,318 | B2* | 1/2019 | Pon | H04L 43/045 |
| 10,187,274 | B1* | 1/2019 | R. | H04L 43/062 |
| 10,237,176 | B2* | 3/2019 | Mutnuru | H04L 45/306 |
| 10,419,328 | B1* | 9/2019 | Dave | H04L 67/10 |
| 10,523,631 | B1* | 12/2019 | Wagner | H04L 12/4633 |
| 2003/0063562 | A1* | 4/2003 | Sarkinen | H04L 47/10 370/230 |
| 2006/0215578 | A1* | 9/2006 | Andrapalliyal | H04L 12/4679 370/254 |
| 2007/0130355 | A1* | 6/2007 | Shah | H04L 45/00 709/230 |
| 2007/0183404 | A1* | 8/2007 | Hofer | H04L 67/1034 370/352 |
| 2008/0304497 | A1* | 12/2008 | Viswanath | H04L 45/122 370/401 |
| 2008/0320166 | A1* | 12/2008 | Filsfils | H04L 45/14 709/242 |
| 2010/0142532 | A1* | 6/2010 | Soja-Molloy | H04L 45/50 370/392 |
| 2010/0316054 | A1* | 12/2010 | Xu | H04L 12/4633 370/392 |
| 2011/0096782 | A1* | 4/2011 | Park | H04L 29/12367 370/392 |
| 2011/0305242 | A1* | 12/2011 | Miki | H04L 49/3009 370/392 |
| 2013/0136138 | A1* | 5/2013 | Miller | H04L 67/14 370/395.53 |
| 2013/0322437 | A1* | 12/2013 | Raszuk | H04L 45/04 370/389 |
| 2014/0254423 | A1 | 9/2014 | Beesabathina et al. | |
| 2014/0310427 | A1 | 10/2014 | Shaw et al. | |
| 2015/0341310 | A1* | 11/2015 | You | G06F 16/9024 709/245 |
| 2017/0289032 | A1* | 10/2017 | Guichard | H04L 45/306 |
| 2017/0302578 | A1* | 10/2017 | Gattani | H04L 45/021 |
| 2018/0343196 | A1* | 11/2018 | Baj | H04L 45/306 |

FOREIGN PATENT DOCUMENTS

| | | |
|---|---|---|
| EP | 3016326 A1 | 5/2016 |
| WO | WO/2017/006081 A1 | 1/2017 |
| WO | WO2017006081 A1 | 1/2017 |

OTHER PUBLICATIONS

Swedish Search Report, App. No. 1751021-5, dated Mar. 22, 2018, pp. 1-2, Swedish Patent and Registration Office, Stockholm, Sweden, Ralph Bostrom.

* cited by examiner

METHODS AND APPARATUSES FOR ROUTING DATA PACKETS IN A NETWORK TOPOLOGY

TECHNICAL FIELD

The present disclosure relates to the field of data communications, and in particular to methods and apparatuses/devices for routing data packets in a network topology using an improved routing protocol that is based on autonomous system numbers.

BACKGROUND

There exist hundreds of different network protocols created for supporting communication between computers and other types of electronic devices. Routing protocols are the family of network protocols that enable computer routers to communicate with each other and in turn to intelligently forward traffic between respective networks. In general, a network routing protocol performs functions which include: discovery which means identifying other routers on the network; routing management for keeping track of all possible destinations (for network messages or data packets) along with some data describing the pathway; and path determination for making dynamic decisions for where to send each network message or data packet.

Examples of routing protocols include Interior Gateway Protocol (IGP) and Exterior Gateway Protocol (EGP).

IGP is a routing protocol which is used to find network path information within an autonomous system, for example a system of corporate local area networks. The gateways (hosts with routers) use this protocol for exchanging routing information in-between. The routing information can then be used by the Internet protocol (IP) or other network protocols to specify how to route transmissions (or data packets). Known IGPs are Routing Information protocol (RIP); Interior Gateway Routing Protocol (IGRP), Open Shortest Path First (OSPF) and Intermediate System to Intermediate System (IS-IS). There is also an Enhanced IGRP (EIGRP) which supports classless IP subnets and improves the efficiency of the routing algorithms compared to IGRP.

EGP is a routing protocol which is used to find network path information between different autonomous systems. EGP is commonly used in the Internet to exchange routing table information. The Border Gateway Protocol (BGP) is an example of EGP. BGP detects modifications to routing tables and selectively communicates those changes to other routers over TCP/IP. Internet providers commonly use BGP to join their networks together.

Another way to route packets is by using Multi-Protocol Label Switching (MPLS) which uses labels attached to packets to forward them through the network. The MPLS labels are advertised between routers. The IP packets are prefixed by these labels and forwarding is done on the basis of these labels and not by the destination IP address which means forwarding of packets is based on a lookup of labels rather than a lookup of the IP addresses hence speeding up the routing procedure. For example, if Router A wishes to send a data packet to Router E, Router A will insert a header in the data packet with a label stack that contains information about the data packet, where it came from, and where it is going. Router A will then send the data packet to Router B, Router B will send the data packet to Router C, Router C will send the data packet to Router D, and Router D will send the data packet to Router E. Each Router strips away past labels and adds new ones in order to keep forwarding the data packet to where it needs to go. Hence, within each router, the incoming label is examined and its next hop is matched with a new label. The old label is replaced with the new label for the packet's next destination, and then the freshly labeled packet is sent to the next router. Each router repeats the process until the packet reaches an egress router.

There are however several problems with current routing protocols. For instance, they require long list of entries in routing tables, and need to be updated whenever there are changes in the network. Label switching using MPLS achieves faster routing but MPLS need to be run over another routing protocol for it to work. This means that two protocols need to run in parallel in each router and due to that the required resources are doubled. Further, in MPLS each router needs to generate a new label to replace the old label as explained above. In BGP, huge entries of routes need to replicate between BGP neighbors in order to build and update the routing table, which requires a great amount of resources of routers. As a consequence, the routing decision time increases. Also any change in a network need to be communicated to all other routers.

There is therefore a need for new methods and apparatuses of routing packets in a network topology that require less consumption of resources, achieve fast routing of packets through fast decision making at each router and provide reduction is size of routing tables.

SUMMARY

It is an object of embodiments herein to solve the above problems by providing methods, and apparatuses or devices for routing packets in a network topology.

According to an aspect of embodiments herein, there is provided a method for routing of data packets in a network topology, the method comprising: sending a request to a server for requesting an Autonomous System (AS) number of an AS to which a destination host belongs, said request including a name of the destination host or an IP destination address of the destination host; receiving a response including the AS number, inserting the AS number at Layer 2.5 of a data packet and sending the packet including the AS number, a source IP address and the IP destination address towards the AS hosting the IP destination address.

According to another aspect of embodiments herein, there is provided a source host device in a network topology, the source host device comprising a processor and a memory containing instructions executable by the processor, wherein the source host device is operative to: send a request to a DNS server for requesting an AS number of an AS to which a destination host belongs, said request including a name of the destination host; receive, from the DNS server, a response including the AS number, an IP destination address of the destination host and the name of the destination host; insert the AS number at Layer 2.5 of a data packet; and send the data packet including the AS number, a source IP address of the source host device and the IP destination address to a source edge router device that is connected to the source host device.

According to another aspect of embodiments herein, there is provided a method performed by the (source) host device as defined in claim 10.

According to another aspects of embodiments herein, there is provided a method performed by an edge router device for routing a data packet in a network topology, the method comprising: receiving a data packet from a source host device, the data packet including an IP address of a destination host; determining a AS number of a AS to which the destination host belongs based on the IP address of the destination host; inserting the AS number at Layer 2.5 of the data packet; determining from a AS routing table, based on the AS number, the next hop router device to which the data packet is to be forwarded, and sending the data packet including the AS number, a source IP address of the source host device and the IP address of the destination host to the next hop router device.

According to another aspect there is provided an edge router device as defined in claim 15.

According to yet another aspect, there is provided a method performed by hop router device for routing a data packet in a network topology, the method comprising: receiving a data packet including an AS number at Layer 2.5 of the received data packet and an IP destination address of a host; comparing the AS number with a AS number associated to the hop router device; if the AS number included in the data packet differs from the AS number associated to the hop router device, determining from a AS routing table, the address of a subsequent next hop router to which the data packet including the AS number is to be forwarded; and sending the data packet to the subsequent next hop router. If the AS number included in the data packet corresponds to the AS number associated to the hop router device, removing the AS number from the data packet and forwarding the data packet to the IP destination address of the host.

According to another aspect, there is provided a hop router device as defined in claim 19.

An advantage with embodiments herein is that when the data packet leaves the source edge router device, the destination IP address of the destination host to which the data packet is to be delivered is not used by any hop router device, except for the destination router device. A hop router device or transit router device only needs to determine from its routing table the address of next hop router to which the data packet is to be sent.

Another advantage is that the routing tables are smaller in size as compared to prior art routing tables. This is because the routing table according to embodiments herein does not include network IDs (IP network addresses). This means that all network IDs (IP network addresses) associated to an AS can be merged to just one entry which is the AS number. This results in the routing being quicker as decision making in each router is fast. Also, less CPU and RAM resources are required by each router.

Another advantage with embodiments herein is that there is no need to replace the AS number for each data packet passing a router. Hence, the AS number inserted by the source host or the source edge router in the data packet is only removed by the destination router. Intermediate or transit routers do not change the content of the data packet at Layer 2.5 or Layer 3.

Additional advantages achieved by the disclosure will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
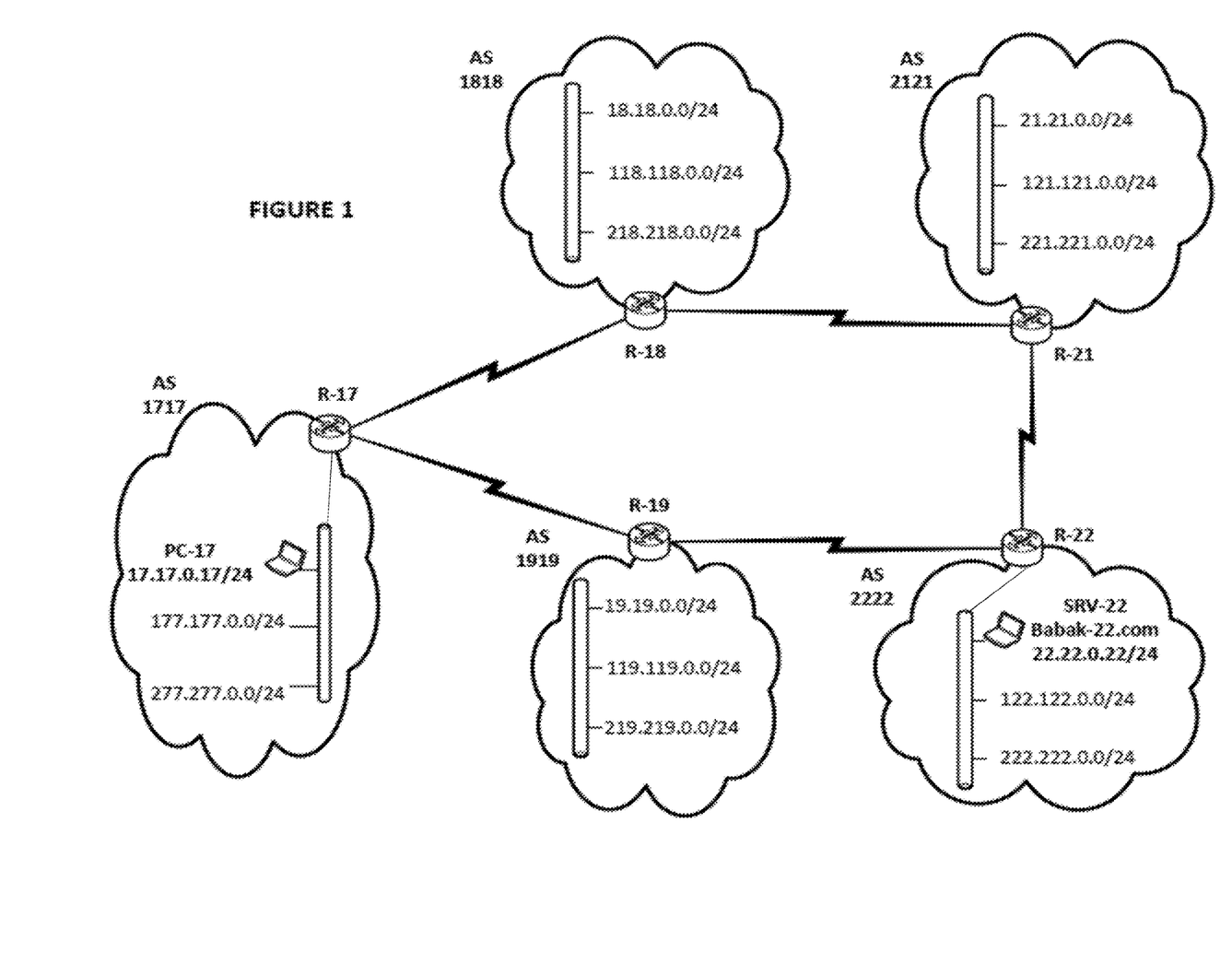
FIG. 1 is an example of a network topology wherein embodiments of the present disclosure may be employed.

Referring to FIG. 1, there is illustrated an example of a network or system topology wherein embodiments herein may be employed.

Hereinafter, is described, according to embodiments herein, a new method for routing data packets in a network topology. According to embodiments herein, each router is configured to build a BGP routing table based on Autonomous System numbers (AS numbers or ASNs) instead of network IDs. The routing decisions performed by the routers are based on AS numbers.

FIG. 1 depicts five autonomous systems, AS 1717, AS 1818, AS 1919, AS 2121 and AS 2222. To each AS is associated an AS edge router device. AS edge router device R-17 is associated to AS 1717, R-18 is associated to AS 1818, R-19 is associated to AS 1919, R-21 is associated to AS 2121 and R-22 is associated to AS 2222. As shown, to each router device/apparatus and within each AS, a plurality of IP addresses or network IDs are dedicated.

For example, in AS 1717, three IP addresses are dedicated 177.177.0.0; 277.277.0.0 and 17.17.0.17. PC-17 which can be any type of host device is depicted having IP address 17.17.0.17. Although host device PC-17 is depicted as a laptop, a host can take any form of communication device such as a smartphone or a stationary computer, a server etc.

AS 2222 is shown hosting a computer SRV-22 connected to router R-22. In this example SRV-22 is hosting a domain name called Babak-22.com as a network name or a DNS name and 22.22.0.22 as the IP address.

In the following, an overview of a procedure for routing data packets according to the prior art is described followed by an overview of a method for routing data packets based on AS numbers in accordance with some embodiments herein followed by an example applying the principles of the present disclosure in a network topology such as the one shown in FIG. 1.

Assume that PC-17 in AS 1717 wants to send data packets to SRV-22 (Babak-22.com) in AS 2222. In this case, PC-17 is a source host device having IP address 17.17.0.17 and SRV-22 is the destination host having IP address 22.22.0.22.

In a simple scenario according to the prior art method, PC-17 looks up the IP address of SRV-22 by sending a query to a local or a global DNS (Domain Name System) server and creates a data packet.

An example of the DNS query is shown below:
DNS query from PC-17

| Name | IP |
|---|---|
| Babak-22.com | ??? |

An example of a DNS server response to PC-17 is shown below:
DNS response to PC-17

| Name | IP |
|---|---|
| Babak-22.com | 22.22.0.22 |

An example of a data packet that is created by PC-17 is depicted below:
PC-17 ready to send out data packet:

| L 2 | | L 3 | |
|---|---|---|---|
| Destination MAC | Source MAC | Source IP | Destination IP |
| R-17 mac | PC-17 mac | 17.17.0.17 | 22.22.0.22 |

The data packet includes at L2 (Layer 2) the destination MAC (Medium Access Control) address of the closest edge router, which is R-17, and the source MAC address of PC-17. The data packet also includes at L3, the source IP address (of PC-17) 17.17.0.17 and the destination IP address (of SRV-22) which is 22.22.0.22. Note that for simplicity, the content of the data packet in terms of payload etc. is not shown since the embodiments herein are not restricted to any type of payload. Instead the focus here is to describe how data packets are routed.

PC-17 sends the data packet to its default source edge router which is R-17 (see FIG. 1). Upon receiving the data packet, R-17 looks at its BGP routing table and sends the data packet to the next hop router. As shown in the routing table of R-17, for destination network address or network ID 22.22.0.0/24, the next hop router is R-19 (underlined in the table).

| R-17 AS Routing table | |
|---|---|
| Destination Network ID (address) | Next hop |
| 18.18.0.0/24 | R-18 |
| 118.118.0.0/24 | R-18 |
| 218.218.0.0/24 | R-18 |
| 19.19.0.0/24 | R-19 |
| 119.119.0.0/24 | R-19 |
| 219.219.0.0/24 | R-19 |
| 21.21.0.0/24 | R-18 |
| 121.121.0.0/24 | R-18 |
| 221.221.0.0/24 | R-18 |
| <u>22.22.0.0/24</u> | <u>R-19</u> |
| 122.122.0.0/24 | R-19 |
| 222.222.0.0/24 | R-19 |

When transit router or next hop router R-19 receives the data packet, the same procedure is performed as that of router R-17, i.e., R-19 performs a look up in its BGP routing table and sends the data packet to the subsequent next hop router which is router R-22. Since R-22 is the destination router, R-22 delivers the data packet to the destination address of SRV-22 which is 22.22.0.22.

As can be seen in the above BGP routing table, router R-17 in AS 1717 includes all individual IP network addresses hosted by AS 1818, AS 1919, AS 2121 and AS 2222. The size of the table is thus large. The routing table becomes larger whenever new network IDs are introduced in the network topology.

Below is described a new method of routing packets in a network topology according to embodiments herein, which is more efficient, faster, and which requires less resources and also less entries in the BGP routing tables of the routers.

Instead of having all IP network addresses in the BGP routing table for every network under a AS, we can have just one route to know how to reach the destination AS. This means that all IP network addresses or network IDs under a AS are represented, in a routing table, by a single number which is the AS number. Also, a router builds its BGP routing table based on what is the best route to reach to the different autonomous systems and not based on the best route for every individual network under different autonomous systems. This way, the BGP routing table is significantly smaller. This leads to that the BGP process is more efficient and faster as compared to prior art method described earlier.

Figure 2:
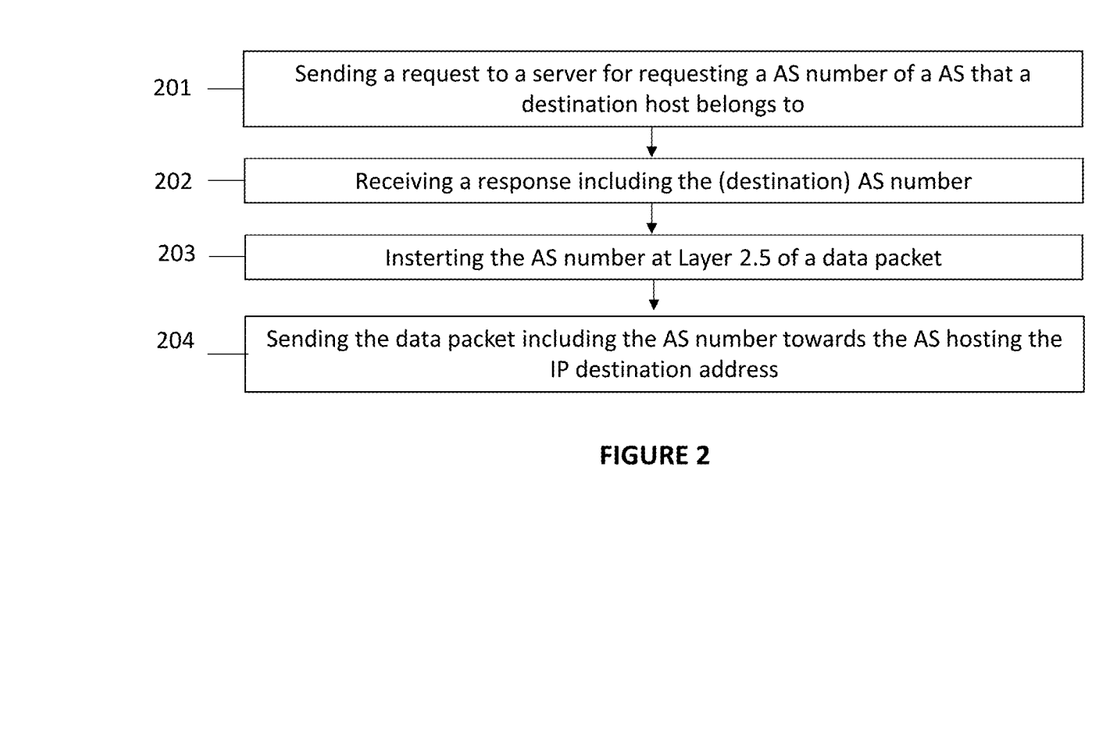
FIG. 2 illustrates a flowchart of a method according to embodiments of the present disclosure.

FIG. 2 depicts the main steps of the method according to the embodiments herein which include:

(201) sending a request to a server for requesting a AS number of a AS to which a destination host belongs, said request including a name of the destination host or an IP destination address of the destination host; the AS number of the AS is also referred to here as the destination AS number;

(202) receiving a response including the AS number;

(203) inserting the AS number at Layer 2.5 (L2.5) of a data packet, and (204) sending the data packet including the AS number i.e. the destination AS, a source IP address and the IP destination address towards the AS hosting the IP destination address.

There are several ways that the AS number may be retrieved. In an exemplary embodiment, assume that PC-17 wants to send a data packet to SRV-22 having public DNS name: Babak-22.com.

1) One of the most important tasks of a DNS server is to map the domain name to the IP address as previously described. But with the new method, we change or redesign the DNS system so that the DNS server provides not only the IP number of the destination host but also the AS number hosting the destination host. Hence, the source host device PC-17 sends a request or query to a DNS server for requesting the AS number, the request or query includes the DNS name of the destination host SRV-22. A simplified example of the DNS query is shown below:

New version of DNS query from PC-17

| Name | IP | AS Number |
|---|---|---|
| Babak-22.com | ??? | ??? |

2) The DNS server, according to this embodiment, sends a response to PC-17. The DNS server response is exemplified below:

New version of DNS response to PC-17

| Name | IP | AS Number |
|---|---|---|
| Babak-22.com | 22.22.0.22 | 2222 |

As an example, the DNS server retrieves the AS number from an IANA (Internet Assigned Numbers Authority) server by sending, e.g., the IP address or the DNS name to the IANA. The IANA server looks up the AS number and provides the DNS server with the AS number that is associated to the DNS name or to the IP address.

3) When PC-17 receives the DNS response, it inserts the destination AS number between Layer 2 and Layer 3, i.e., at Layer 2.5 of the data packet and sends the data packet towards the AS hosting the IP destination address of SRV-22. An example of the structure of the data packet is shown below:

PC-17 ready to send out packet—(Next Generation)

| L 2 | | L 2.5 | L 3 | |
|---|---|---|---|---|
| Destination | Source | Destination | | |
| MAC | MAC | AS | Source IP | Destination IP |
| R-17 mac | PC-17 mac | 2222 | 17.17.0.17 | 22.22.0.22 |

As depicted, the data packet includes the destination AS 2222 at Layer 2.5. The data packet also includes the destination IP address of SRV-22, the MAC address of R-17, the MAC address of PC-17 and the destination IP address of the host.

When the closest router device R-17, which is the source edge router device, receives the data packet, it looks at the L2.5 part of the packet to see what the destination AS is. R-17 then determines, from the AS BGP routing table, the next hop router for this destination AS number to which the data packet is to be forwarded based on the AS number, and sends the data packet to the next hop router.

As previously explained, the edge router device R-17 for AS 1717 uses BGP. The new BGP routing table is built based on destination AS numbers instead of destination network IP addresses. In this case the simplified routing table is shown below:

| R-17 AS new Routing table | |
|---|---|
| AS Number | Next hop |
| 2222 | R-19 |
| 2121 | R-18 |
| 1818 | R-18 |
| 1919 | R-19 |

As seen from the table above, no IP network address is listed in the table, i.e., all IP network addresses under an AS are represented by the AS number. It is also clear that the routing table is much smaller compared to prior art BGP tables. This also improves the BGP processing. Further, R-17 does not need to open the data packet at Layer 3.

4) From the table above, and based on the destination AS number AS 2222, the source edge router R-17 determines, from L2.5 part of the packet, that the next hop router is R-19 (underlined in the table). The data packet to be sent from R-17 to R-19 is exemplified below:

R-17 ready to send out packet:

| L 2 | | L 2.5 | L 3 | |
|---|---|---|---|---|
| Destination | Source | Destination | | |
| MAC | MAC | AS | Source IP | Destination IP |
| R-19 | R-17 mac | 2222 | 17.17.0.17 | 22.22.0.22 |

5) When the next hop router R-19 receives the data packet, it just looks at L2.5 to determine which AS number is indicated as destination AS. Since the AS number 2222 differs from the AS number associated to router R-19 (which is AS 1919), router device R-19 determines from its own AS BGP routing table, the subsequent next hop router to which the data packet is to be forwarded and sends the data packet to the subsequent next hop router. As seen here, there is no change on the L2.5 and L3 part of the packet. Transit routers don't change anything in the packet except L2, which is normal. Below is shown the R-19 AS BGP routing table:

| R-19 AS new Routing table | |
|---|---|
| AS Number | Next hop |
| 2222 | R-22 |
| 2121 | R-22 |
| 1818 | R-17 |
| 1717 | R-17 |

As depicted, the subsequent next hop router device is R-22.

The packet that is sent to R-22 is exemplified below:

R-17 ready to send out packet:

| L 2 | | L 2.5 | L 3 | |
|---|---|---|---|---|
| Destination | Source | Destination | | |
| MAC | MAC | AS | Source IP | Destination IP |
| R-22 | R-19 mac | 2222 | 17.17.0.17 | 22.22.0.22 |

6) When the packet reaches R-22, this router looks at L2.5 and because the AS number AS 2222 indicated in the packet corresponds (i.e., is equal) to the AS number associated to router R-22, router R-12 removes the AS number 2222 and looks at L3 to determine the IP destination address of the destination host SRV-22 which is 22.22.0.22. Router device R-12 (destination router) then sends/delivers the data packet to the destination host.

As is clear from the above, BGP routing tables are significantly smaller because they include the destination AS numbers instead of individual destination IP network addresses (network IDs) under a AS.

Having smaller topology table enables the routing protocol algorithm to run faster. In addition, less resources from routers are required to find the best route, i.e., this improves the communications/conversations between routers.

Further, any change in network IDs under an AS does not affect the size of the table. In addition, changes in networks IDs do not require update or replication between the BGP routers, and there is no need to re-run the BGP algorithms due to those changes.

Another advantage is that ACL (Access Control List), PBR (Policy Base Routing) and QoS (Quality of Service) can process much faster and efficiently when the filter is a group of networks/ASs. And the filter is applied on L2.5 where the AS number is indicated. Hence, in many cases decisions are made in L2.5 instead of L3.

For instance, when an ACL/PBR is created on a router to apply a specific destination network ID, transit networks do not need to look in L3 to check if the ACL/PBR is a match for them or not. Instead, with the new method, only the router belonging to the destination AS looks in L3.

For instance, assume that there is an ACL on a router to block traffic destined to IP 18.18.0.18. With just this one ACL line, all packets passing through the router need to be, according to the prior art, looked up at L3 to see if their destination address is 18.18.0.18 or not. But with the new method according to the embodiments herein, only those packets that include an AS number of an AS hosting IP address 18.18.0.18 need to be looked up at L3. The filtering thus applies on L2.5 for decision making instead of L3.

Figure 3:
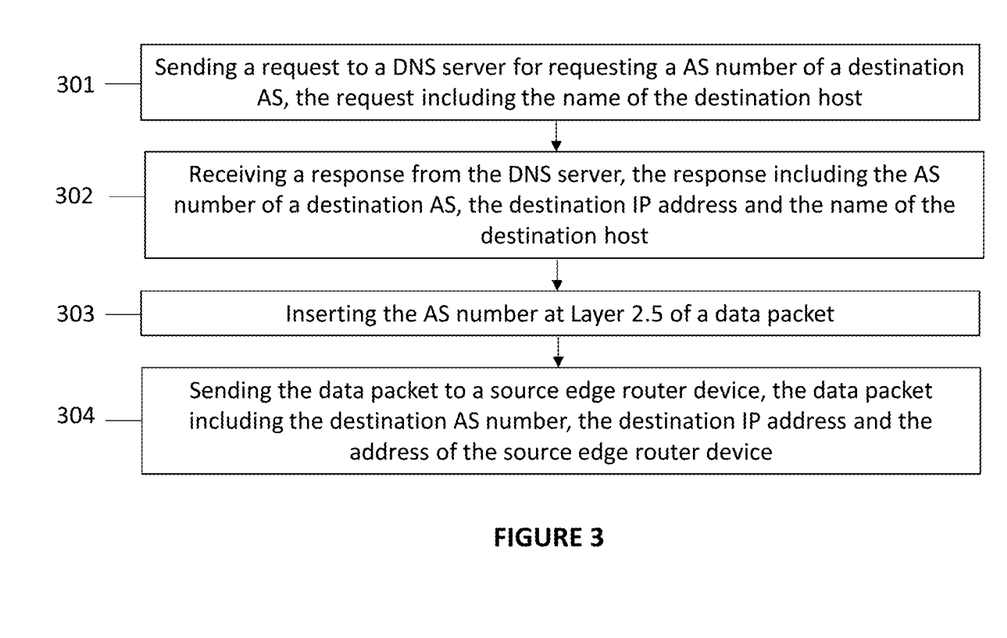
FIG. 3 illustrates a flowchart of a method performed by a source host device according to some embodiments herein.

Summary of the actions performed by a source host device (e.g., PC-17) in conjunction with FIG. 3 includes:

(301) Sending a request to a DNS server for requesting an AS number of a destination AS, the request including the name or the IP address of the destination host (e.g. SRV-22);

(302) Receiving a response from the DNS server, the response including the AS number, i.e., the destination AS number, the destination IP address and the name of the destination host;

(303) Inserting the AS number at L2.5 of a data packet, and (304) Sending the data packet to a source edge router device, the data packet includes the destination AS number, the destination IP address and the IP address of the source edge router device that is connected to the source host device.

Instead of the source host device requesting the (destination) AS number, an AS look-up task can be given to the source edge router device in accordance with another embodiment. This means that the source host device (e.g., PC-17) generates a standard data packet with no additional field and sends the packets to its default gateway which is the source edge router device (e.g., R-17). Then the edge router device determines an AS number of an AS to which the destination host belongs based on the IP destination address of this destination host.

For example, the source edge router device may send a request to an IANA server or any other online "AS number lookup" website of a server to retrieve the AS number for the destination IP address indicated in the data packet.

In another example, the source edge router device requests the AS number from a local AS number resolver server which can have a connection to the IANA server or to an online "AS number lookup" website or a server. This is similar to DNS technology where there is an internal DNS server that responds to a local query. The AS number resolver server may be internal to the edge routers or be externally connected to the edge routers.

When the source edge router device retrieves the AS number, it inserts it at L2.5 of the packet received from the source host device. Then, the edge router determines from an AS routing table, based on the AS number, the next hop router device to which the data packet is to be forwarded and, sends the data packet including the destination AS number, a source IP address of the source host device and the IP destination address of the destination host to the next hop router device.

An advantage with the above embodiment is that there is no need for the source host device to change the packet format. The AS number(s) can be cached locally on the router for a defined period of time to use for some other similar queries.

It should be mentioned that from a security point of view security policies may need to be amended to let the router device have a direct connection to the internet to look up the AS number. The security policies for the routers are outside the scope of the embodiments of the present disclosure.

Figure 4:
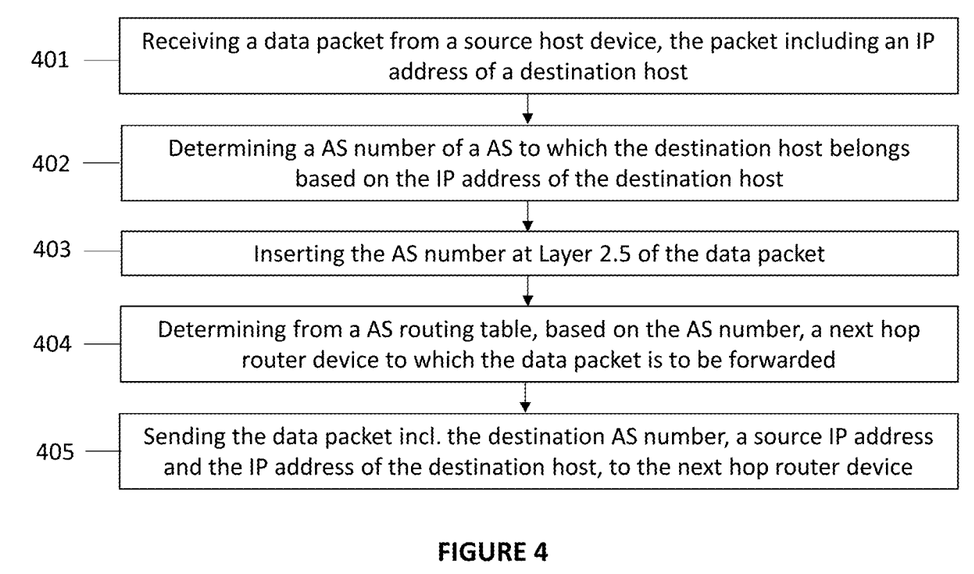
FIG. 4 illustrates a flowchart of a method performed by a source edge router device according to some embodiments herein.

Summary of the actions described above and performed by a (source) edge router device (e.g., R-17) in conjunction with FIG. 4 includes:

(401) Receiving a data packet from a source host device (e.g., PC-17), the data packet including an IP destination address of a destination host (e.g., SRV-222);

(402) Determining a (destination) AS number to which the destination host belongs based on the IP destination address of the destination host. As previously described this may be done by querying an IANA server or an "ASN lookup" website of a server or a local AS number resolver server.

(403) Inserting the AS number at Layer 2-5 of the data packet;

(404) Determining from an AS routing table, based on the AS number, a next hop router device to which the data packet is to be forwarded; and (405) Sending the data packet including the AS number, i.e., the destination AS number, a source IP address and the destination IP address of the destination host to the next hop router device.

Figure 5:
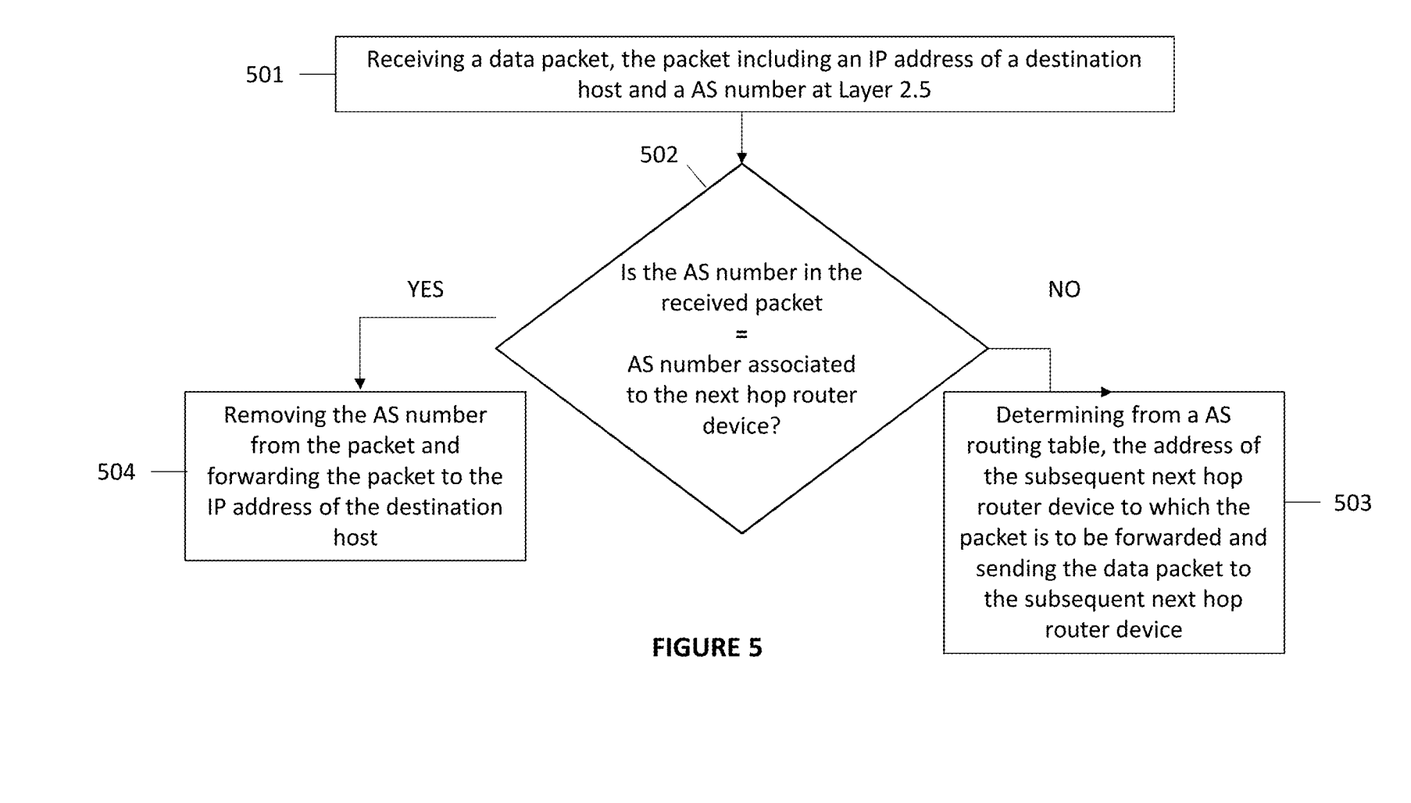
FIG. 5 illustrates a flowchart of a method performed by a hop router device according to some embodiments herein.

Referring to FIG. 5, there is illustrated the main steps performed by the (next) hop router device in accordance with embodiments herein.

(501) Receiving a data packet, the data packet including a destination AS number at Layer 2.5 of the packet and an IP address of a destination host;

(502) Comparing the AS number with an AS number associated to the hop router device. As shown in step (502), the hop router device checks if the AS number in the data packet is equal or not equal to the AS number associated to the next hop router device.

(503) IF the AS number in the data packet differs (indicated by NO) from the AS number associated to the next hop router, determining from the AS routing table of the hop router device, the address of a subsequent next hop router device to which the data packet is to be forwarded and sending the data packet to the subsequent next hop router device.

(504) If the AS number in the data packet corresponds (indicated by YES) to the AS number associated to the next hop router device, removing the AS number from the packet and forwarding the data packet to the IP destination address of the host within the AS.

Figure 6:
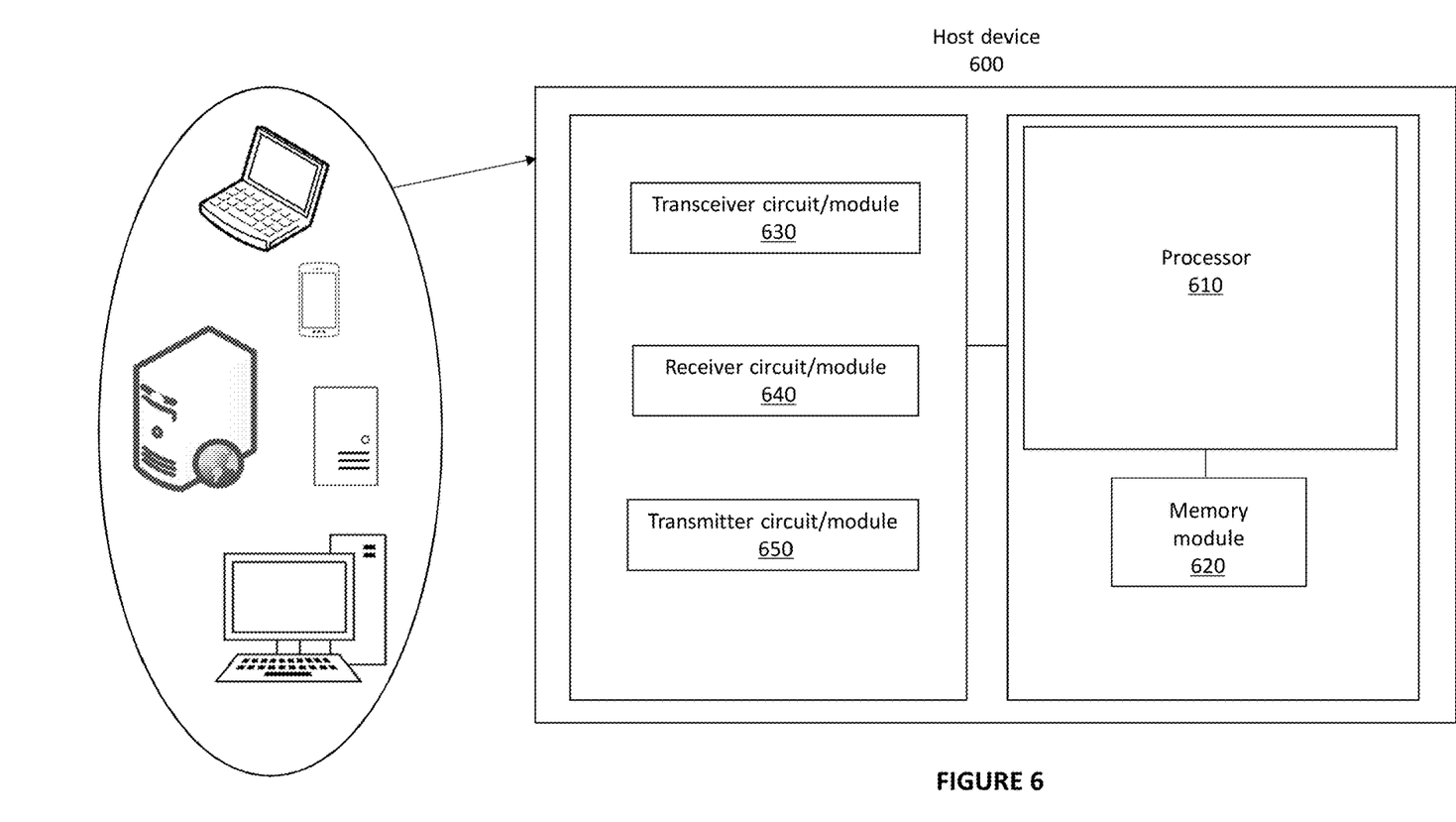
FIG. 6 illustrates a block diagram of a source host device according to some embodiments herein.

The present disclosure also relates to a (source) host device 600 to perform the method steps previously described in conjunction with FIG. 3. An exemplary block diagram of a (source) host device 600 is depicted in FIG. 6. As shown, the device 600 may be any type of communication device such as a PC, a laptop, a smartphone, a stationary computer, a server etc.

The host device 600 comprises a processing circuit or a processing module or a processor 610; a memory module 620; a receiver circuit or receiver module 640; a transmitter circuit or transmitter module 650; and a transceiver circuit or transceiver module 630 which may include the transmitter circuit 650 and the receiver circuit 640. The host device 600 may support any radio access technology including 2G, 3G, 4 G, 5G, Wifi, Wimax or a combination thereof.

The processing module/circuit 610 includes a processor, microprocessor, an application specific integrated circuit (ASIC), field programmable gate array (FPGA), or the like, and may be referred to as the "processor 610". The processor 610 controls the operation of the host device 600 and its components. Memory (circuit or module) 620 includes a random access memory (RAM), a read only memory (ROM), and/or another type of memory to store data and instructions that may be used by processor 610. In general, it will be understood that the host device 600 in one or more embodiments includes fixed or programmed circuitry that is configured to carry out the operations in any of the embodiments disclosed herein.

The processor 610 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory module 620 specially adapts or configures the processor 610 to carry out the operations of the host device 600 disclosed herein. Further, it will be appreciated that the host device 600 may comprise additional components not shown in FIG. 6.

The source host device 600 by means of processor 610 is operative to send a request to a DNS server for requesting an AS number of an AS to which a destination host belongs. The request includes a name and/or the IP destination address of the destination host. The processor 610 is further operation to receive, from the DNS server, a response including the AS number, an IP destination address of the destination host and a name of the destination host. The processor 610 is operative to insert the AS number at Layer 2.5 of a data packet and to send the data packet including the AS number, a source destination address of the source host device 600 and the IP destination address of a source edge router that is connected to the source host device. Additional actions performed by the source host device have already been described and need not be repeated.

There is also provided a computer program comprising instructions which when executed on at least one processor 610 of the source host device 600 according to embodiments herein, cause the at least one processor 610 to carry out the method previously described. Also, a carrier containing the computer program is provided, wherein the carrier is one of a computer readable storage medium; an electronic signal, optical signal or a radio signal.

Figure 7:
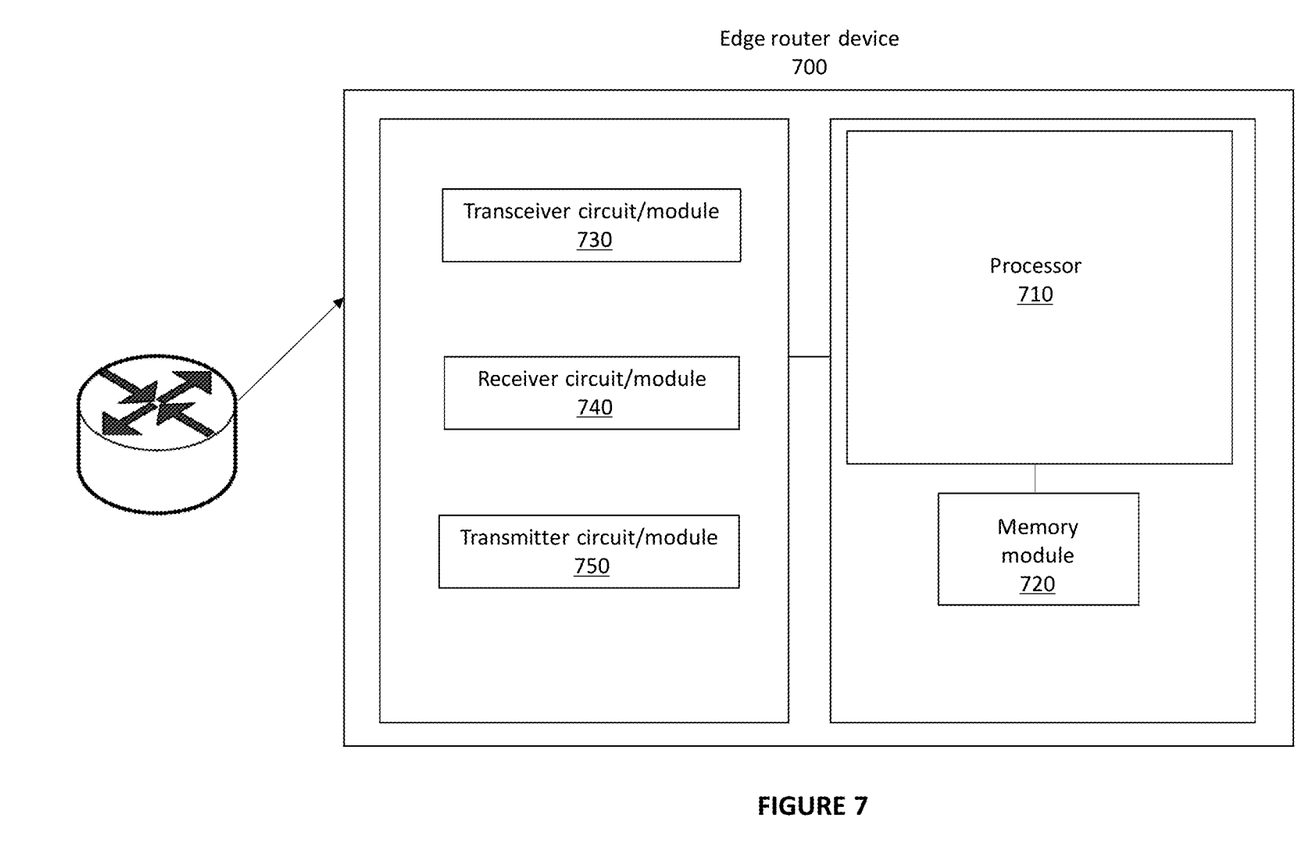
FIG. 7 illustrates a block diagram of an edge router device according to some embodiments herein.

The present disclosure also relates to a (source) edge router device 700 to perform the method steps previously described in conjunction with FIG. 4. An exemplary block diagram of a (source) edge router device 700 is depicted in FIG. 7.

The edge router device 700 comprises a processing circuit or a processing module or a processor 710; a memory module 720; a receiver circuit or receiver module 740; a transmitter circuit or transmitter module 750; and a transceiver circuit or transceiver module 730 which may include the transmitter circuit 750 and the receiver circuit 740. The source edge router device 700 may support any radio access technology including 2G, 3G, 4 G, 5G, Wifi, Wimax, or a combination thereof.

The processing module/circuit 710 includes a processor, microprocessor, an application specific integrated circuit (ASIC), field programmable gate array (FPGA), or the like, and may be referred to as the "processor 710". The processor 710 controls the operation of the edge router device 700 and its components. Memory (circuit or module) 720 includes a random access memory (RAM), a read only memory (ROM), and/or another type of memory to store data and instructions that may be used by processor 710. In general, it will be understood that the source edge router 700 in one or more embodiments includes fixed or programmed circuitry that is configured to carry out the operations in any of the embodiments disclosed herein.

The processor 710 is operative to receive a data packet from a source host device 600, the data packet including an IP destination address of a destination host. The processor 710 is further operative to determine an AS number of an AS to which the destination host belongs based on the IP address of the destination host; to insert the AS number at Layer 2.5 of the data packet; to determine from an AS routing table, based on the AS number, the address of the next hop router device to which the data packet is to be forwarded, and to send the data packet including the AS number, a source IP address of the source host device and the IP address of the destination host to the next hop router device 800 (in FIG. 8). The processor 710 is operative to determine the AS number by sending a request or query to an IANA server or to an "AS number lookup" website of a server, the request or query comprising the IP address of the destination host. Alternatively, the processor 710 is operative to determine the AS number by requesting the AS number from a local AS number resolver server that it connected to an IANA server.

There is also provided a computer program comprising instructions which when executed on at least one processor 710 of the source edge router device 700 according to embodiments herein, cause the at least one processor 710 to carry out the method previously described. Also, a carrier containing the computer program is provided, wherein the carrier is one of a computer readable storage medium; an electronic signal, optical signal or a radio signal.

Figure 8:
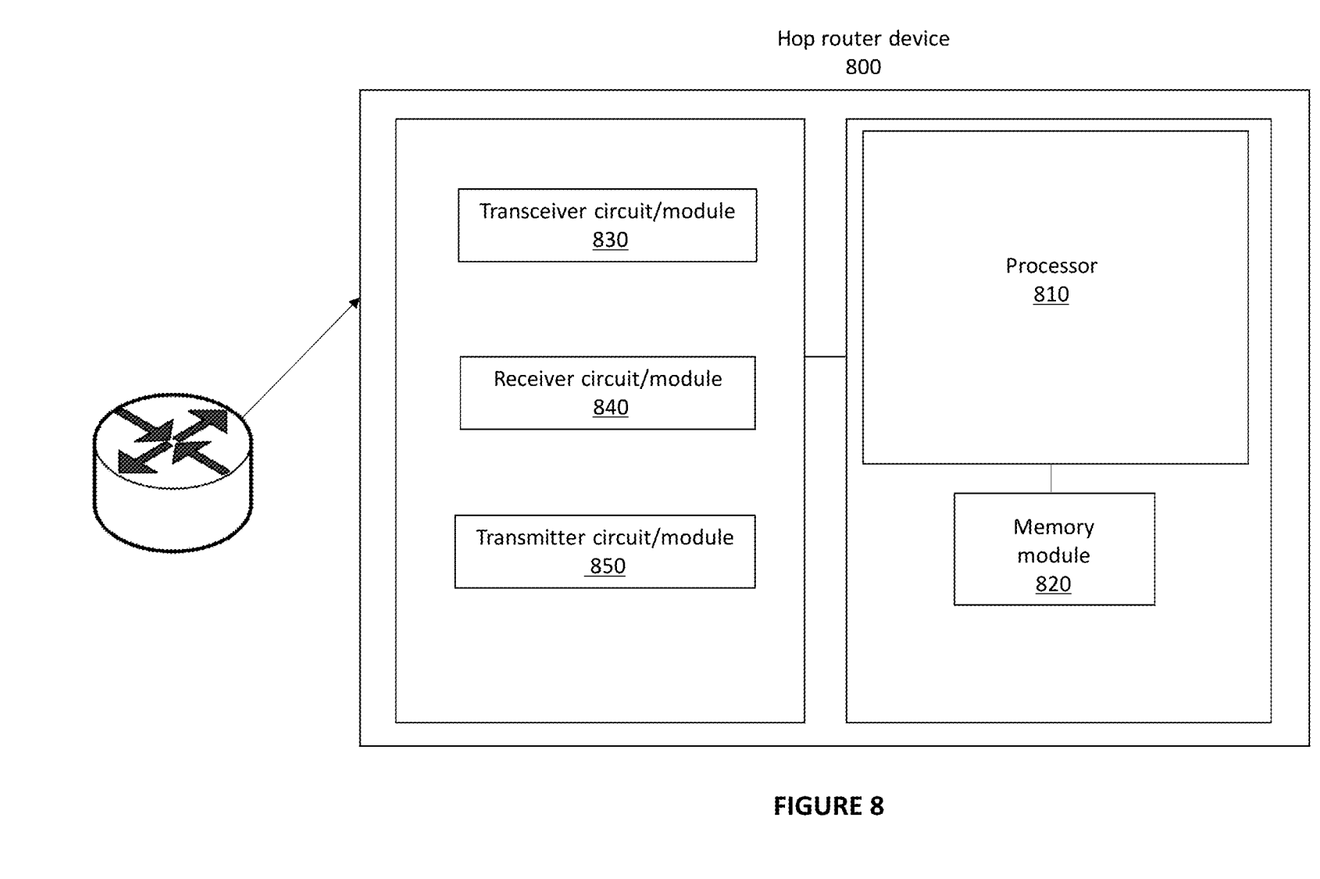
FIG. 8 illustrates a block diagram of a hop router device according to some embodiments herein.

The present disclosure also relates to a (next) hop router device 800 to perform the method steps previously described in conjunction with FIG. 5. An exemplary block diagram of a (next) hop router device 800 is depicted in FIG. 8.

The hop router device 800 comprises a processing circuit or a processing module or a processor 810; a memory module 820; a receiver circuit or receiver module 840; a transmitter circuit or transmitter module 850; and a transceiver circuit or transceiver module 830 which may include the transmitter circuit 850 and the receiver circuit 840. The hop router device 800 may support any radio access technology including 2G, 3G, 4 G, 5G, Wifi, Wimax, or a combination thereof.

The processing module/circuit 810 includes a processor, microprocessor, an application specific integrated circuit (ASIC), field programmable gate array (FPGA), or the like, and may be referred to as the "processor 810". The processor 810 controls the operation of the hop router device 800 and its components. Memory (circuit or module) 820 includes a random access memory (RAM), a read only memory (ROM), and/or another type of memory to store data and instructions that may be used by processor 810. In general, it will be understood that the hop router device 800 in one or more embodiments includes fixed or programmed circuitry that is configured to carry out the operations in any of the embodiments disclosed herein.

The processor 810 is operative to receive a data packet including an AS number at Layer 2.5 and an IP destination address of a destination host. The processor is further operative to compare the AS number with an AS number associated to the hop router device 800. If the AS included in the data packet differs from a AS number associated to the hop router device 800, the processor 810 is operative to determine from an AS routing table, the address of a subsequent next hop router device to which the data is to be forwarded and to send the data packet to the subsequent next hop router device. If the AS number included in the data packet corresponds (is equal) to the AS number associated to the hop router device 800, the processor 810 is operative to remove the AS number from the data packet and to forward the data packet the IP destination address of the destination host.

There is also provided a computer program comprising instructions which when executed on at least one processor 810 of the hop router device 800 according to embodiments herein, cause the at least one processor 810 to carry out the method previously described. Also, a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for routing of data packets in a network topology, the method comprising:
    sending a request to a server oar requesting an Autonomous system, AS, number, of an AS to which a destination host belongs, said request including a name of the destination host or an IP destination address of the destination host,
    wherein sending the request is performed by a source host device and wherein the server is a Domain Name Server, DNS, server, and the response from DNS server further includes the IP destination address and the name of the destination host;
    receiving a response including the AS number;
    inserting the AS number at Layer 2.5 of a data packet;
    and sending the data packet including the AS number, a source IP address and the IP destination address towards the AS hosting the IP destination address;
    wherein sending the data packet including the AS number comprises sending the data packet to a source edge router device that is connected to the source host device, and the source edge router device determining, from an AS routing table, a next, hop router device to which the data packet is to be forwarded based on the AS number and the source edge router sending the data packet including the AS number to the next hop router device;
    and when the AS number in the data packet received by the next hop router device corresponds to an AS number associated with the next hop router device, removing, by the next hop router device, the AS number from the data packet and forwarding the data packet to the IP destination address of the host belonging to the AS having the AS number that is removed from the data packet.

2. The method according to claim 1, wherein sending the request is performed by a source edge router device that is connected to ft the source host device and wherein the server is an Assigned Numbers Authority, IANA, server.

3. The method according to claim 1, wherein, if the AS number included in the data packet received by the next hop router device differs from an AS number associated with the next hop router device, determining from an AS routing table of the next hop router device, an address of a subsequent next hop router device to which the data packet is to be forwarded, the next hop router device sending the data packet to the subsequent next hop router device.

4. A method performed by a hop router device for routing a data packet in a network topology, the method comprising:
    receiving a data packet including an Autonomous System, AS, number at Layer 2.5 of the received data packet and an IP destination address of a host;
    comparing the AS number with an AS number associated with the hop router device;
    if the AS number included in the data packet differs from the number associated with the hop router device, determining from an AS routing table, an address of a subsequent next hop router device to which the data packet including the AS number is to be forwarded,
    and sending the data packet to the subsequent next hop router device;
    and when the AS number included in the data packet corresponds to the AS number associated with the hop router device, removing the AS number from the data packet and forwarding the data packet to the IP destination address of the host.

5. An hop router device for routing a data packet in a network topology, the hop router device comprising a processor and a memory, said memory containing instructions executable by the processor, wherein the hop router device is operative to:
    receive a data packet including an AS number at Layer 2.5 of the received data packet and an IP destination address of a host,
    compare the AS number with an AS number associated with the hop router device;
    if the AS number included in the data packet differs from the AS number associated with the hop router device, determine from an AS routing table, an address of a subsequent next hop router device to which the data packet including the AS number is to be forwarded, and send the data to the subsequent next hop router device;
    and when the AS number included in the data packet corresponds to the AS number associated with the hop router device, remove the AS number from the data packet and forward the data packet to the IP destination address of the host.

* * * * *